UNITED STATES PATENT OFFICE.

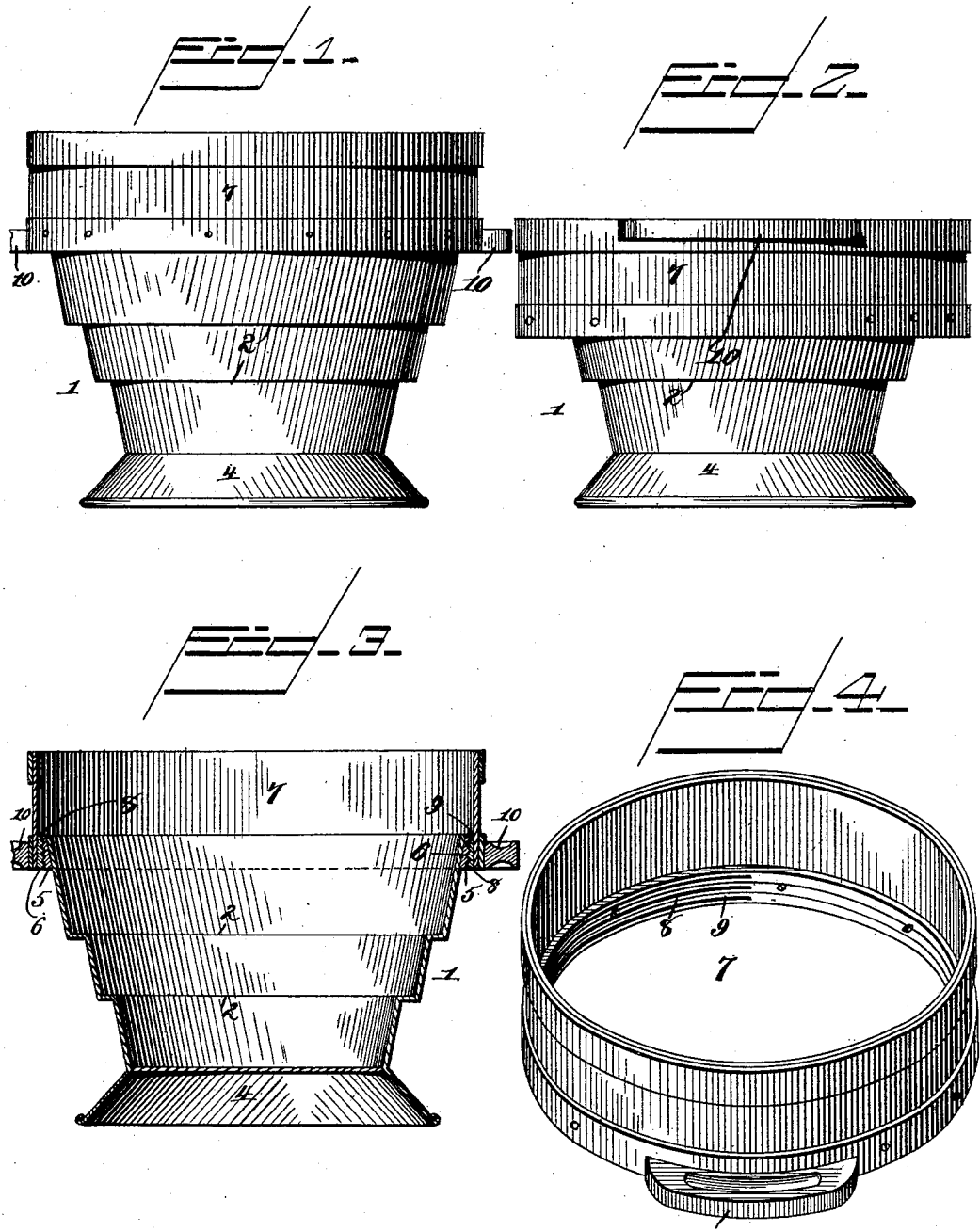

DENNIS A. McGEE, OF MOUNT CARMEL, PENNSYLVANIA.

MEASURING-VESSEL.

SPECIFICATION forming part of Letters Patent No. 453,936, dated June 9, 1891.

Application filed February 5, 1891. Serial No. 380,331. (No model.)

*To all whom it may concern:*

Be it known that I, DENNIS A. MCGEE, a citizen of the United States, residing at Mount Carmel, in the county of Northumberland and State of Pennsylvania, have invented a new and useful Combined Measure, of which the following is a specification.

My invention relates to measures, and the objects in view are to combine a series of measures in one, thereby lessening the number of graduated measures usually carried about by hucksters and other provision dealers.

A further purpose of the invention is to decrease the size of the measure, so that while capable of measuring large quantities of stuffs it may be adapted for easy handling and storage.

With the above objects in view the invention consists in certain features of construction hereinafter specified, and particularly pointed out in the claims.

Referring to the drawings, Figure 1 is a side elevation of a measure constructed in accordance with my invention, the same being shown as adapted to measure its full capacity. Fig. 2 is a similar view, the measure being reduced and adapted to measure other than its full capacity. Fig. 3 is a vertical transverse section of the measure. Fig. 4 is a detail in perspective of the removable section.

Like numerals of reference indicate like parts in all the figures of the drawings.

In practicing my invention I construct the main body of the measure 1 of inverted-cone shape and provide the same with a series of annular shoulders 2, thus dividing the body of the measure into quarts, quarter-pecks, half-pecks, and six quarts or three-quarter pecks; or the proportions may be changed, as may be desired. The body thus formed may be formed of wood or metal, and is preferably provided with a suitable flared base 4, upon which the measure may stand.

Encircling the upper edge of the body 1 is a metal ring 5, riveted at intervals to the body of the measure and provided with external threads 6, as shown.

7 designates a cylindrical section provided upon its inner side and at its lower edge with a metal ring 8, riveted at intervals to the section and having internal screw-threads 9. The section is provided with handles 10, located at diametrically-opposite sides thereof, and said section and its ring are of such size relative to the upper end and ring of the body of the measure as to readily receive the latter, upon which it is screwed.

It will be observed that various quantities of stuff may be readily measured in the measure 1, and that by adding the section to the measure a still larger quantity, as an entire peck, may be measured. By unscrewing the section and inverting and reapplying the same the measure is not increased in capacity beyond its original size and the section is out of the way and always conveniently at hand ready to mount in operative position when occasion may require.

By the above it will be apparent that I have provided in a single article a series of graduated measures, each one of which may be used singly or the entire series may be used as a whole.

A measure thus constructed, while combining all the advantages of several distinct measures, is capable of wider use, and, while more convenient as to its decrease in number of parts and also cheaper, may be readily stored under the seat or other out-of-the-way place.

Having described my invention, what I claim is—

1. The combination, with the graduated measure having external screw-threads at its upper end, of a reversible cylindrical section having internal screw-threads at its lower end, substantially as specified.

2. The combination, with the graduated measure and the external screw-threaded ring secured to the upper end of the same, of the cylindrical section provided at opposite sides with suitable handles and at its lower end having secured thereto an internal screw-threaded ring for engaging the ring of the measure, substantially as specified.

In testimony that I claim the foregoing as my own I have hereto affixed my signature in presence of two witnesses.

DENNIS A. McGEE.

Witnesses:
  PETER A. STIEF,
  E. E. WHITE.